US008948945B2

(12) United States Patent
Tsuneishi et al.

(10) Patent No.: US 8,948,945 B2
(45) Date of Patent: Feb. 3, 2015

(54) HYBRID VEHICLE

(75) Inventors: Junya Tsuneishi, Saitama (JP); Atsushi Izumiura, Saitama (JP); Masahiro Takeuchi, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 254 days.

(21) Appl. No.: 13/577,361

(22) PCT Filed: Mar. 30, 2011

(86) PCT No.: PCT/JP2011/058101
§ 371 (c)(1),
(2), (4) Date: Aug. 6, 2012

(87) PCT Pub. No.: WO2011/125783
PCT Pub. Date: Oct. 13, 2011

(65) Prior Publication Data
US 2012/0303201 A1   Nov. 29, 2012

(30) Foreign Application Priority Data
Mar. 31, 2010   (JP) ................................. 2010-081302

(51) Int. Cl.
*B60W 10/113*   (2012.01)
*B60W 20/00*   (2006.01)
(Continued)

(52) U.S. Cl.
CPC ................ *B60W 20/00* (2013.01); *B60K 6/547* (2013.01); *B60W 10/113* (2013.01);
(Continued)

(58) Field of Classification Search
CPC ... B60W 10/06; B60W 10/08; B60W 10/113; B60W 20/00; B60W 20/10; B60W 20/106; B60W 20/40; B60W 6/20; B60W 6/36; B60W 6/38; B60W 6/547; F16H 59/14; F16H 61/0213
USPC ................ 701/22, 53; 180/65.265, 65.6, 65.7
See application file for complete search history.

(56) References Cited

U.S. PATENT DOCUMENTS 6,356,818 B1 *   3/2002   Wakashiro et al. ............. 701/22
2002/0033059 A1   3/2002   Pels et al.
(Continued)

FOREIGN PATENT DOCUMENTS

| JP | 2000-177412 A | 6/2000 |
| JP | 2002-089594 A | 3/2002 |
| JP | 2003-165358 A | 6/2003 |
| JP | 2006-132448 A | 5/2006 |
| JP | 2008-247156 A | 10/2008 |

OTHER PUBLICATIONS

Machine Translation of JP2003165358 A—Tatsuya et al., Power Transmission Mechanism, Jun. 10, 2003, Japanese Patent Publication JP 2003-165358 A.*

(Continued)

*Primary Examiner* — John Q Nguyen
*Assistant Examiner* — Nadeem Odeh
(74) *Attorney, Agent, or Firm* — Westerman, Hattori, Daniels & Adrian, LLP

(57) ABSTRACT

A hybrid vehicle is equipped with a required driving force acquiring element 22 which obtains a required driving force necessary to be output, and an electric motor driving force acquiring element 23 which acquires a maximum electric motor driving force Tm capable of being output by the force output from an electric motor MG according to each speed stage, taking into consideration a remaining capacity of an electric storage device BATT. When the required driving force Tq is equal to or smaller than the maximum electric motor driving force Tm, a highest speed stage in which the electric motor MG is capable of outputting the required driving force Tq is determined, an automatic transmission 1 is controlled so that the determined speed stage is set, and the vehicle is made to travel only by the force of the electric motor MG.

7 Claims, 8 Drawing Sheets

(51) Int. Cl.
  *B60K 6/547* (2007.10)
  *F16H 61/02* (2006.01)
  *B60K 6/48* (2007.10)
  *F16H 59/14* (2006.01)
(52) U.S. Cl.
  CPC ... *F16H 61/0213* (2013.01); *B60K 2006/4825* (2013.01); *B60W 2510/083* (2013.01); *B60W 2510/085* (2013.01); *B60W 2510/244* (2013.01); *B60W 2710/1005* (2013.01); *B60W 2710/105* (2013.01); *Y02T 10/6252* (2013.01); *B60Y 2200/92* (2013.01); *F16H 2059/148* (2013.01)
  USPC .......................... 701/22; 701/53; 180/65.265

(56) References Cited

U.S. PATENT DOCUMENTS

| | | | |
|---|---|---|---|
| 2005/0101432 A1 | 5/2005 | Pels et al. | |
| 2008/0195286 A1* | 8/2008 | Tabata et al. | 701/51 |
| 2008/0243322 A1 | 10/2008 | Nobumoto et al. | |
| 2008/0275601 A1* | 11/2008 | Saito et al. | 701/22 |

OTHER PUBLICATIONS

International Search Report for PCT/JP2011/058101, mailing date of Jun. 28, 2011.

* cited by examiner

FIG.3

| | IMA START-UP | IDLING STOP | IDLING CHARGE | TRAVEL CHARGE | DECELERATIVE REGENERATION | ENGINE RELEASE | EV TRAVEL | ASSIST | MOTOR ROTATIONAL SPEED MATCHING |
|---|---|---|---|---|---|---|---|---|---|
| D-zone | ○ | ○ | × | × | △ | △ | ○ | ○ | △ |
| A-zone H | ○ | ○ | × | × | ○ | ○ | ○ | ○ | ○ |
| A-zone M | ○ | ○ | △ | △ | ○ | ○ | ○ | ○ | ○ |
| A-zone L | ○ | △ | △ | △ | ○ | △ | △ | △ | ○ |
| B-zone | ○ | × | ○ | ○ | ○ | × | × | △ | ○ |
| C-zone | △ | × | ○ | ○ | ○ | × | × | × | △ |

○ : PERMIT   △ : LIMIT   × : PROHIBIT

HYBRID VEHICLE

TECHNICAL FIELD

The present invention relates to a hybrid vehicle equipped with an internal combustion engine, an electric motor, an electric storage device, and an automatic transmission.

BACKGROUND ART

Conventionally, there is known a hybrid vehicle equipped with an automatic transmission having a first input shaft which is selectively coupled to an output shaft via a plurality of gear trains establishing gear shift stages, and which is connected to an electric motor, a second input shaft which is selectively coupled to the output shaft via a plurality of gear trains establishing speed stages, a first clutch capable of switching between a transmission state of transmitting a driving force of an internal combustion engine to the first input shaft and an opened state which cuts off the transmission, and a second clutch capable of switching between the transmission state of transmitting the driving force of the internal combustion engine to the second input shaft and the opened state which cuts off the transmission (for example, refer to Patent Document 1).

PRIOR ART REFERENCE

Patent Document

Patent Document 1: Japanese Patent Laid-Open No. 2002-89594

DISCLOSURE OF THE INVENTION

Problems to be Solved by the Invention

However, Patent Document 1 is silent on selection of the traveling state between an ENG travel only by the driving force of the internal combustion engine, an EV travel only by the driving force of the electric motor, and a HEV travel by the driving force of the internal combustion engine and the electric motor, and the selection of the speed stages.

The present invention aims at providing a hybrid vehicle capable of selecting the traveling state and the speed stages appropriately.

Means for Solving the Problems

The hybrid vehicle of the present invention is a hybrid vehicle, comprising: an internal combustion engine; an electric motor; an electric storage device providing and receiving electric power to and from the electric motor; an automatic transmission including a first converting mechanism which is transmitted with a driving force of the internal combustion engine selectively via a first make-and-break element, and which is connected to the electric motor, and a second converting mechanism which is transmitted with the driving force of the internal combustion engine selectively via a second make-and-break element, wherein a motive power output from the internal combustion engine and the electric motor is changed to a plurality of speed stages and is output; a remaining capacity detecting element which detects a remaining capacity of the electric storage device; a required driving force acquiring element which acquires a required driving force that is necessary to be output; an electric motor driving force acquiring element which acquires a maximum electric motor driving force capable of being output according to each speed stage by the motive power output from the electric motor, at least taking into consideration the remaining capacity of the electric storage device detected by the remaining capacity detecting element; and a control element which determines a highest speed stage in which the electric motor is capable of outputting the required driving force, when the required driving force acquired by the required driving force acquiring element is equal to or smaller than the maximum electric motor driving force acquired by the electric motor driving force acquiring element, controls the automatic transmission so that the determined speed stage is set, and controls so as to make the vehicle travel only from the driving force of the electric motor, by setting the first make-and-break element and the second make-and-break element to an interrupted state.

According to the hybrid vehicle of the present invention, if the required driving force acquired by the required driving force acquiring element is equal to or smaller than the maximum electric motor driving force acquired by the electric motor driving force acquiring element, the vehicle is made to travel only by the force from the electric motor. Therefore, it becomes possible to reduce the fuel consumption amount by the internal combustion engine.

At this time, the highest speed stage capable of outputting the required driving force by the electric motor is determined, and the automatic transmission is controlled so as to set the determined speed stage. Therefore, it becomes possible to reduce the rotational speed of the shaft of the first conversion mechanism (the first input shaft) which is transmitted with the driving force from the internal combustion engine and is connected to the electric motor, and thereafter, becomes possible to suppress the vibration which is generated when starting up the internal combustion engine by setting the first make-and-break element to the connected state.

Further, in the hybrid vehicle of the present invention, it is preferable that the first converting mechanism includes a first input shaft which is transmitted with the driving force of the internal combustion engine selectively via the first make-and-break element, and which is connected to the electric motor, and a first selecting element which couples the first input shaft and an output mechanism via a gear train selected from a plurality of gear trains, the second converting mechanism includes a second input shaft which is transmitted with the driving force of the internal combustion engine selectively via the second make-and-break element, and a second selecting element which couples the second input shaft and the output mechanism via a gear train selected from a plurality of the gear trains, and in the case where the vehicle is made to travel only from the driving force of the electric motor by establishing the speed stage of the automatic transmission with a coupled state by the first selecting element, when the required driving force acquired by the required driving force acquiring element exceeds the maximum electric motor driving force acquired by the electric motor driving force acquiring element, the control element couples the gear train to the output mechanism by the second selecting element without setting the second make-and-break element to a transmission state, while maintaining the coupled state by the first selecting element, starts up the internal combustion engine by gradually setting the first make-and-break element to the transmission state, thereafter makes the internal combustion engine fire, and makes the vehicle travel by the driving force of the internal combustion engine and the electric motor, by setting the second make-and-break element to the transmission state after completion of the start up of the internal combustion engine.

In this case, during traveling of the vehicle only by the driving force of the electric motor, when the required driving force acquired by the required driving force acquiring element exceeds the maximum electric motor driving force acquired by the electric motor driving force acquiring element, the internal combustion engine is started up by gradually setting the first make-and-break element to the transmission state, while maintaining the coupled state by the first selecting element. Therefore, it becomes possible to suppress deceleration accompanying the transition of the speed stage at start up of the internal combustion engine and to maintain the vehicle speed.

At this time, in the case where there is a gear train with lower transmission gear ratio than the gear train connected by the first selecting element, it is preferable to connect the gear train to the output mechanism by the second selecting element without setting the second make-and-break element to the transmission state.

By doing so, it becomes possible to promptly transit to the speed stage of the transmission gear ratio after starting up the internal combustion engine. Further, when making the vehicle travel by the driving force of the internal combustion engine and the electric motor, it becomes possible to promptly accelerate the vehicle, since it is transited to the speed stage with lower transmission gear ratio. Further, when coupling the gear train to the output shaft by the second selecting element, the driving force is not transmitted to the output mechanism via the gear train, since the second make-and-break element is not set to the transmission state.

It is preferable to complete the starting up of the internal combustion engine, by making the internal combustion engine to fire, and thereafter setting the first make-and-break element to the interrupted state. Further, the internal combustion engine may be started up without changing the speed stage.

The output mechanism is the one connected to a driving mechanism which drives driving wheels of the vehicle by the motive power changed by the automatic transmission, and typically is an output shaft. It may be of the structure in which the output mechanism is made of one output shaft, and the output shaft is coupled to the first input shaft by the gear train selected by the first selecting element, and is coupled to the second input shaft by the gear train selected by the second selecting element. Further, it may be of the structure in which the output mechanism is constituted from two output shafts, one output shaft being coupled to the first input shaft via the gear train selected by the first selecting element, and the other output shaft being coupled to the second input shaft via the gear train selected by the second selecting element.

Further, in the hybrid vehicle of the present invention, it is preferable that, in the case where the vehicle is made to travel by the driving force of the internal combustion engine and the electric motor, when the required driving force acquired by the required driving force acquiring element becomes equal to or less than the maximum electric motor driving force acquired by the electric motor driving force acquiring element, the control element sets the first make-and-break element and the second make-and-break element to the interrupted state, and makes the vehicle travel only from the driving force of the electric motor.

In this case, during traveling of the vehicle by the driving force of the internal combustion engine and the electric motor, when the required driving force acquired by the required driving force acquiring element becomes equal to or lower than the maximum electric motor driving force acquired by the electric motor driving force acquiring element, the vehicle is made to travel only by the force from the electric motor. By doing so, it becomes possible to decrease the fuel consumption amount by the internal combustion engine.

Further, in the hybrid vehicle of the present invention, it is preferable that the hybrid vehicle comprises a variable speed map which selects a speed stage of the automatic transmission on the basis of the required driving force acquired by the required driving force acquiring element, and a zone distinguishing element which distinguishes, on the basis of the detected remaining capacity detected by the remaining capacity detecting element, a standard zone, a discharge limited zone in which the remaining capacity is smaller than the standard zone, a discharge prohibited zone in which the remaining capacity is smaller than the discharge limited zone, and a charge prohibited zone in which the remaining capacity is larger than the standard zone, wherein the first converting mechanism includes a first input shaft which is transmitted with the driving force of the internal combustion engine selectively via the first make-and-break element, and which is connected to the electric motor, and a first selecting element which couples the first input shaft and an output mechanism via a gear train selected from a plurality of gear trains, the second converting mechanism includes a second input shaft which is transmitted with the driving force of the internal combustion engine selectively via the second make-and-break element, and a second selecting element which couples the second input shaft and the output mechanism via a gear train selected from a plurality of the gear trains, and when the vehicle is made to travel by the driving force of the internal combustion engine by establishing the speed stage of the automatic transmission with the coupled state by the first selecting element, in the case of changing to a lower speed stage side of the automatic transmission by referring to the variable speed map, the control element establishes a speed stage lower by one speed stage from the speed stage by setting the first make-and-break element to the transmission interrupted state and the second selecting element to the connected state and the second make-and-break element to the transmission state, according to an estimated value of the required driving force in the case where the zone distinguished by the zone distinguishing element is the standard zone, and thereafter make the electric motor to regenerate power by either returning to the speed stage or setting the first selecting element to the state where a speed stage further lower by one speed stage is established.

In this case, when it is in the standard zone in which the discharge and the charge is neither limited nor restricted, in the case where it is possible to obtain the predicted value of the required driving force, then it becomes possible to select the appropriate speed stage according to the predicted value.

Further, in the hybrid vehicle of the present invention, it is preferable that the vehicle further comprises a variable speed map which selects a speed stage of the automatic transmission on the basis of the required driving force acquired by the required driving force acquiring element, and a zone distinguishing element which distinguishes, on the basis of the detected remaining capacity detected by the remaining capacity detecting element, a standard zone, a discharge limited zone in which the remaining capacity is smaller than the standard zone, and a discharge prohibited zone in which the remaining capacity is smaller than the discharge limited zone, wherein the first converting mechanism includes a first input shaft which is transmitted with the driving force of the internal combustion engine selectively via the first make-and-break element, and which is connected to the electric motor, and a first selecting element which couples the first input shaft and an output mechanism via a gear train selected from a plurality of gear trains, the second converting mechanism includes a second input shaft which is transmitted with the driving force of the internal combustion engine selectively via the second make-and-break element, and a second selecting element which couples the second input shaft and the output mechanism via a gear train selected from a plurality of the gear trains, and when the vehicle is made to travel by the driving force of the internal combustion engine by establishing the speed stage of the automatic transmission with the coupled state by the first selecting element, in the case of changing to a lower speed stage side of the automatic transmission by referring to the variable speed map, the control element maintains the speed stage in the case where the zone distinguished by the zone distinguishing element is the discharge limited zone.

In this case, even in the case of generally shifting to the lower speed stage side of the automatic transmission while referring to the variable speed map, the speed stage is maintained when the zone is in the discharge limited zone. By doing so, it becomes possible to increase the remaining capacity of the electric storage device, by making the electric motor perform regenerative operation using a part of the driving force of the internal combustion engine.

Further, in the hybrid vehicle of the present invention, it is preferable that, in the case where the vehicle is made to travel by establishing the speed stage of the automatic transmission with the coupled state by the first selecting element, when the required driving force acquired by the required driving force acquiring element is small and it is possible to make the vehicle travel at a lower speed stage than the current speed stage by referring to the variable speed map, and a fuel consumption rate deteriorates than a predetermined threshold value if the travel is pursued at the current speed stage, the control element supplies electricity to the electric storage device by regenerating a difference between the required driving force and the driving force of the internal combustion engine by the electric motor by either one of a first means in which the vehicle is made to travel by establishing the speed stage of the automatic transmission with the coupled state by the second selecting element by setting the second make-and-break element to the transmission state, after setting the first make-and-break element to the interrupted state, and the first input shaft is coupled to the gear train with the first selecting element, or a second means in which the gear train coupled by the first selecting element is changed to a gear train with lower transmission gear ratio.

In this case, it becomes possible to prevent the fuel consumption rate from deteriorating by continuing travel at the current speed stage, and further, it becomes possible to store electricity at the electric storage device by regeneration with the difference between the required driving force and the driving force of the internal combustion engine. Preferably, whether to perform the first means or the second means is selected, giving priority to storing electricity by the electricity storage device when it is in the discharge limited zone or the discharge prohibited zone, and giving priority to the fuel consumption rate when it is in the standard zone.

In the case of performing the second means, it is preferable that the setting of the coupling state by the second selecting element is completed before setting the second make-and-break element to the transmission state. By doing so, it becomes possible to prevent delivering a shock from shifting to the driver.

Further, it is preferable that, in the case of performing the first means, the control element makes the first selecting element couple the first input shaft and the output mechanism by a gear train in which efficiency of securing regeneration amount is maximum.

In this case, it becomes possible to increase the electric storage amount at the electric storage device effectively.

BRIEF DESCRIPTION OF THE DRAWINGS

FIG. 3 A table showing permission, limitation, prohibition of various operation according to the zone of the electric storage device.

MODE FOR CARRYING OUT THE INVENTION

Figure 1:
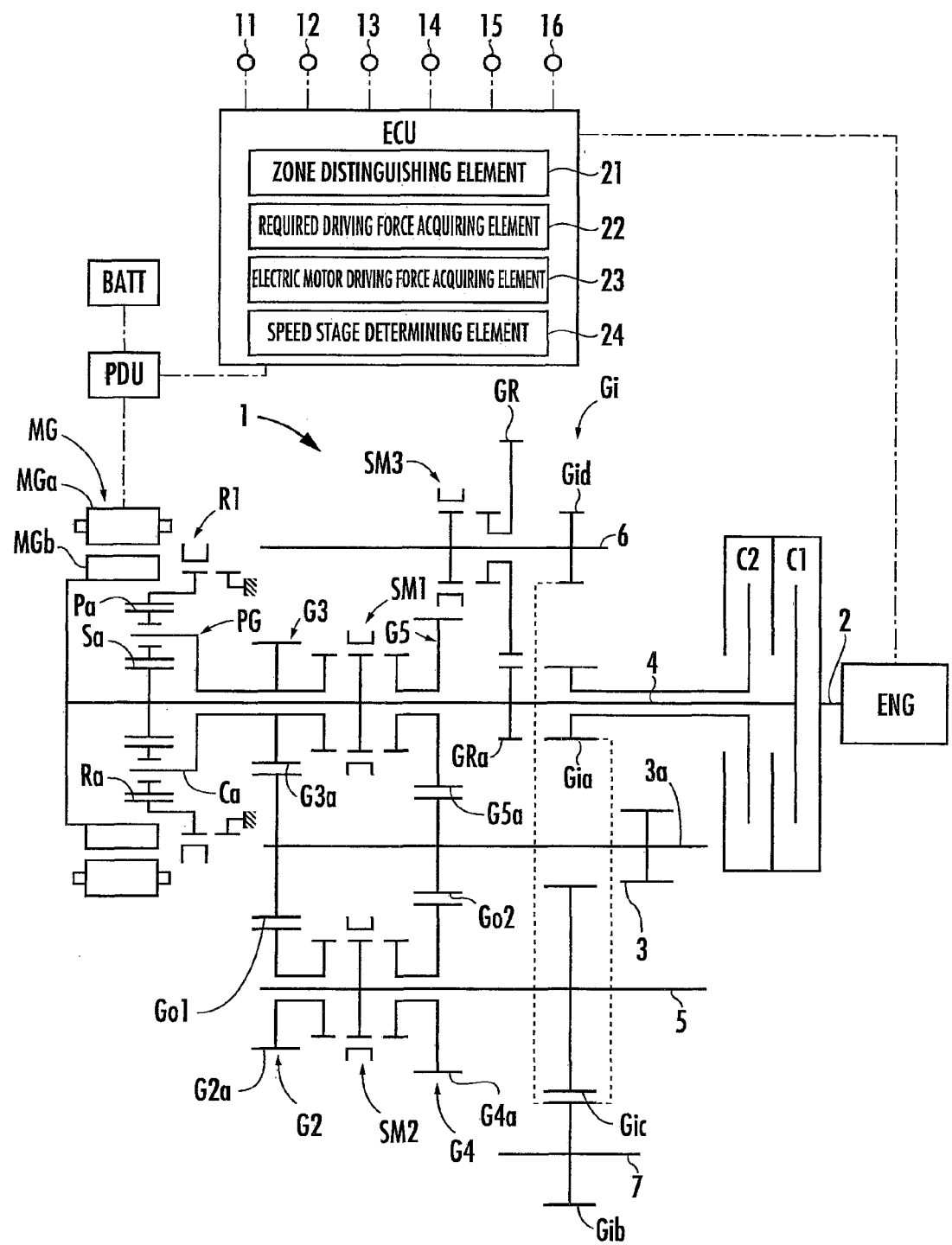
FIG. 1 An explanatory view showing a hybrid vehicle according to an embodiment of the present invention.

Referring to the drawings, an embodiment of the hybrid vehicle according to the present invention will be explained.

The hybrid vehicle illustrated in FIG. 1 is equipped with an internal combustion engine ENG, an electric motor MG, an electric storage device BATT comprising a secondary battery which sends and receives electricity to and from the electric motor MG, an automatic transmission 1, and a power control device ECU (Electric Control Unit) which controls each part of the automatic transmission 1, the internal combustion engine ENG, and the electric motor MG.

The automatic transmission 1 is equipped with an engine output shaft 2 to which a driving power (an output torque) of the internal combustion engine ENG is transmitted, an output member 3 constituted by an output gear which outputs the power to right and left front wheels serving as drive wheels through the intermediary of a differential gear, which is not shown, and a plurality of gear trains G2 to G5 having different transmission gear ratios.

Further, the automatic transmission 1 includes a first input shaft 4, which rotatably supports drive gears G3a and G5a of odd gear trains G3 and G5 which establish each gear shift stages of odd ordinals in a transmission gear ratio rank order, a second input shaft 5, which rotatably supports drive gears G2a and G4a of even gear trains G2 and G4 which establish gear shift stages of even ordinals in the transmission gear ratio rank order, and a reverse shaft 6, which rotatably supports a reverse gear GR. The first input shaft 4 is disposed on the same axial line with the engine output shaft 2, and the second input shaft 5 and the reverse shaft 6 are arranged in parallel to the first input shaft 4.

Further, the automatic transmission 1 is equipped with an idle gear train G1 constituted by an idle drive gear Gia rotatably supported by the first input shaft 4, a first idle driven gear Gib, which is fixed to an idle shaft 7 and which meshes with the idle drive gear Gia, a second idle driven gear Gic, which is fixed to the second input shaft 5, and a third idle driven gear Gid, which is fixed to the reverse gear 6 and which meshes with the first idle drive gear Gib. The idle shaft 7 is arranged in parallel to the first input shaft 4.

The automatic transmission 1 includes a first clutch C1 (a first make-and-break element) and a second clutch C2 (a second make-and-break element) that comprises a dry friction clutch or a wet friction clutch of a hydraulically-actuated type. The first clutch C1 is configured to be freely switchable between a transmission state in which the driving power of the internal combustion engine ENG transmitted to the engine output shaft 2 is transmitted to the first input shaft 4, and an opened state (a transmission interrupted state) in which the transmission is cut off. The second clutch C2 is configured to be freely switchable between the transmission state in which the driving force of the internal combustion engine ENG transmitted to the engine output shaft 2 is transmitted to the second input shaft 5, and the opened state in which the transmission is cut off. When the transmission state is established by engaging the second clutch C2, the engine output shaft 2 is connected to the second input shaft 5 through the first idle driven gear Gib and the second idle driven gear Gic.

It is preferable that the both clutches C1 and C2 are actuated by an electrical actuator so that the state is changed promptly. The both clutches C1 and C2 may be actuated by a hydraulic-type actuator.

Further, in the automatic transmission 1, a planetary gear mechanism PG which is a differential rotary mechanism is disposed coaxially with the engine output shaft 2. The planetary gear mechanism PG is a single pinion type composed of a sun gear Sa, a ring gear Ra, and a carrier Ca, which rotatably supports a pinion Pa meshing with the sun gear Sa and the ring gear Ra such that these gears rotate on their axes and revolve in an orbital motion.

If three rotational elements composed of the sun gear Sa, the carrier Ca, and the ring gear Ra of the planetary gear mechanism PG are defined as a first rotational element, a second rotational element and a third rotational element from the sun gear Sa side in the order in which they are arranged at intervals corresponding to gear ratios in the velocity diagram (a diagram capable or representing a relative rotational speed of each rotational element with straight lines), then the first rotational element corresponds to the sun gear Sa, the second rotational element corresponds to the carrier Ca, and the third rotational element corresponds to the ring gear Ra.

When the gear ratio of the planetary gear mechanism PG (the number of teeth of the ring gear Ra/the number of teeth of the sun gear Sa) being denoted by g, a ratio of an interval between the sun gear Sa serving as the first rotational element and the carrier Ca serving as the second rotational element and an interval between the carrier Ca serving as the second rotational element and the ring gear Ra serving as the third rotational element becomes g:1.

The sun gear Sa serving as the first rotational element is secured to the first input shaft 4. The carrier Ca serving as the second rotational element is connected to the 3rd-speed drive gear G3a of the 3rd-speed gear train G3. The ring gear Ra serving as the third rotational element is disengageably fixed to an immovable portion such as a transmission case by a lock mechanism R1.

The lock mechanism R1 is configured from a synchromesh mechanism capable of switching freely between a fixed state in which the ring gear Ra is fixed to the immovable portion and the opened state in which the ring gear Ra is rotatable.

The lock mechanism R1 is not limited to the synchromesh mechanism, and may be configured from a friction engagement release mechanism such as a sleeve, brakes such as a wet type multi-disc brake, a hub brake, and a band brake and the like, a one-way clutch, or a two-way clutch and the like.

Also, the planetary gear mechanism PG may be configured from a double pinion type comprising a sun gear, a ring gear, and a carrier, which rotatably supports a pair of pinions Pa, Pa' engaging with each other and one of the pinion engaging with the sun gear Sa and the other of the pinion engaging with the ring gear Ra such that these gears rotate on their axes and revolve in an orbital motion. In this case, for example, it may be configured so that the sun gear (the first rotational element) is fixed to the first input shaft 4, the ring gear (the second rotational element) is connected to the 3rd-speed drive gear G3a of the 3rd-speed gear train G3, and the carrier (the third rotational element) is disengageably fixed to the immovable portion by the lock mechanism R1.

A hollow electric motor MG (motor/generator) is disposed on the outer side in the radial direction of the planetary gear mechanism PG. In other words, the planetary gear mechanism PG is disposed in the inner side of the hollow electric motor MG. The electric motor MG has a stator MGa and a rotor MGb.

Further, the electric motor MG is controlled through the intermediary of a power drive unit PDU on the basis of instruction signals of the power control device ECU. The power control device ECU switches the power drive unit PDU, as necessary, between a drive mode in which the electric power of the electric storage device BATT is consumed to drive the electric motor MG and a regenerative mode in which electric power is generated while restraining the rotational force of the rotor MGb and the generated electric power is charged into the electric storage device BATT through the intermediary of the power drive unit PDU.

The reverse shaft 6 rotatably supports the reverse gear GR. A first driven gear Go1, which engages with a 2nd-speed drive gear G2a and a 3rd-speed drive gear G3a, is fixed to an output shaft 3a (an output mechanism), which supports the output member 3. Further, a second driven gear G02, which engages with a 4th-speed drive gear G4a and a 5th-speed drive gear GSa, is fixed to the output shaft 3a.

Thus, constructing the driven gear of the 2nd-speed gear train G2 and the 3rd-speed gear train G3 and the driven gears of the 4th-speed gear train G4 and the 5th-speed gear train G5 by the single gear Go1 and the single gear Go2, respectively, makes it possible to shorten the axial length of the automatic transmission and thereby improving its mountability in an FF (front-wheel-drive) type vehicle.

The first input shaft 4 has a first meshing mechanism SM1, which is a first selecting element, which is composed of a synchromesh mechanism and which is capable of switching to one of a 3rd-speed side coupled state in which the 3rd-speed drive gear G3a and the first input shaft 4 are coupled, a 5th-speed side coupled state in which the 5th-speed drive gear G5a and the first input shaft 4 are coupled, and a neutral state in which the coupling of the 3rd-speed drive gear G3a and the 5th-speed drive gear G5a to the first input shaft 4 are cut off.

The second input shaft 5 has a second meshing mechanism SM2, which is a second selecting element, which is composed of a synchromesh mechanism and which is capable of switching to one of a 2nd-speed side coupled state in which the 2nd-speed drive gear G2a and the second input shaft 5 are coupled, a 4th-speed side coupled state in which the 4th-speed drive gear G4a and the second input shaft 5 are coupled, and the neutral state in which the coupling of the 2nd-speed drive gear G2a and the 4th-speed drive gear G4a to the second input shaft 5 are cut off.

The reverse shaft 6 has a third meshing mechanism SM3, which is composed of a synchromesh mechanism and which is capable of switching to one of a coupled state in which the reverse gear GR and the reverse shaft 6 are coupled, and the neutral state in which the coupling of the two are cut off.

Next, the operation of the automatic transmission 1 configured as is mentioned above will be explained.

The automatic transmission 1 is capable of performing an IMA start-up of starting up the internal combustion engine ENG using the driving force of the electric motor MG by engaging the first clutch C1.

In the case of establishing a 1st speed stage by using the driving force of the internal combustion engine ENG the ring gear Ra of the planetary gear mechanism PG is set to the fixed state by the lock mechanism R1, and the first clutch C1 is engaged to the transmission state.

The driving force of the internal combustion engine ENG is input to the sun gear Sa of the planetary gear mechanism PG through the intermediary of the engine output shaft 2, the first clutch C1, and the first input shaft 4. The rotational speed of the internal combustion engine ENG input to the engine output shaft 2 is reduced to $1/(g+1)$, and the reduced rotational speed is transmitted to the 3rd-speed drive gear G3a via the carrier Ca.

Denoting the gear ratio of the 3rd-speed gear train G3 composed of the 3rd-speed drive gear G3a and the first driven gear Go1 (the number of teeth of the 3rd-speed drive gear G3a/the number of teeth of the first driven gear Go1) by i, the driving force transmitted to the 3rd-speed drive gear G3a is shifted to $1/i(g+1)$ and then output from an output member 3 through the intermediary of the first driven gear Go1 and the output shaft 3a, thus establishing the 1st speed stage. By doing so, it becomes possible to perform an ENG travel of traveling only with the driving force of the internal combustion engine ENG.

As is explained above, the automatic transmission 1 is capable of establishing the 1st speed stage with the planetary gear mechanism PG and the 3rd-speed gear train, a special meshing mechanism for the 1st speed stage is not necessary, so that it becomes possible to shorten the axial length of the automatic transmission 1.

A first converting mechanism is a mechanism which is transmitted with the driving force of the internal combustion engine ENG selectively with the intermediary of the first clutch C1, is connected to the electric motor MG which outputs the driving forces from the two after changing speed to the output shaft 3a, and which is configured from the first input shaft 4, the first meshing mechanism SM1, the planetary gear mechanism PG and the like. A second converting mechanism is a mechanism which is transmitted with the driving force of the internal combustion engine ENG selectively with the intermediary of the second clutch C2, which outputs the driving force after changing speed to the output shaft 3a, and which is configured from the second input shaft 5, the second meshing mechanism SM2, the planetary gear mechanism PG and the like.

In the 1st speed stage, when the vehicle is in a decelerating state according to a remaining capacity (a charging rate) SOC of the electric storage device BATT, the power control device ECU performs a decelerating regeneration operation of performing electric generation by braking with the electric motor MG. Further, according to the remaining capacity SOC of the electric storage device BATT, it becomes possible to drive the electric motor MG and perform HEV (Hybrid Electric Vehicle) travel which supplements the driving force of the internal combustion engine ENG, or an EV (Electric Vehicle) travel which travels only with the driving force of the electric motor MG.

Further, in the case where the deceleration of the vehicle is allowed during the EV travel, and the vehicle speed is at a predetermined speed or more, it becomes possible to start up the internal combustion engine ENG using a kinetic energy of the vehicle, by gradually engaging the first clutch C1, without using the driving force of the electric motor MG.

If the power control device ECU predicts while traveling at the 1st speed stage that the 1st speed stage will be shifted up to the 2nd speed stage on the basis of vehicle information, such as a vehicle speed and the opening degree of the accelerator pedal, then the power control device ECU sets the second meshing mechanism SM2 to the 2nd-speed side coupled state in which the 2nd-speed drive gear G2a and the second input shaft 5 are coupled or a pre-shift state approximating to the aforesaid state.

To establish the 2nd speed stage by using the driving force of the internal combustion engine ENG the second meshing mechanism SM2 is set to the 2nd-speed side coupled state in which the 2nd-speed drive gear G2a is coupled to the second input shaft 5, and then the second clutch C2 is engaged to the transmission state. By doing so, the driving force of the internal combustion engine ENG is output from the output member 3, through the intermediary of the second clutch C2, the idle gear train G1, the second input shaft 5, the 2nd-speed gear train G2, and the output shaft 3a.

If the power control device ECU predicts while traveling at the 2nd speed stage that the 2nd speed stage will be shifted up, then the power control device ECU sets the first meshing mechanism SM1 to the 3rd-speed side coupled state in which the 3rd-speed drive gear G3a and the first input shaft 4 are coupled or a pre-shift state approximating to the aforesaid state.

In contrast, if the power control device ECU predicts a shift down, the first meshing mechanism SM1 is set to the neutral state in which the coupling of the 3rd-speed drive gear G3a and the 5th-speed drive gear G5a to the first input shaft 4 are cut off.

By doing so, it becomes possible to perform shift-up or shift-down by setting the first clutch C1 to the transmission state and setting the second clutch C2 to the opened state, so that the switching of the speed stage may be performed smoothly without interrupting driving force.

Further, also in the 2nd speed stage, in the case where the vehicle is in the decelerating state, the power control device ECU performs the decelerating regeneration operation, according to the remaining capacity SOC of the electric storage device BATT. In the case of performing the decelerating regeneration operation in the 2nd speed stage, it differs whether the first meshing mechanism SM1 is the 3rd-speed side coupled state or the neutral state.

In the case where the first meshing mechanism SM1 is the 3rd-speed side coupled state, the third drive gear G3a, which is rotated by the first driven gear Go1 rotated by the second drive gear G2a, rotates the rotor MGb of the electric motor MG through the intermediary of the first input shaft 4. Therefore, regeneration is performed by suppressing rotation of the rotor MGb and braking so as to generate power.

In the case where the first meshing mechanism SM1 is the neutral state, regeneration is performed by setting the rotational speed of the ring gear Ra to 0 by setting the lock mechanism R1 to the fixed state, and by braking the rotational speed of the carrier Ca rotating together with the 3rd-speed drive gear G3a meshing with the first driven gear Go1 by making the electric motor MG connected to the sun gear Sa to generate power.

Further, in the case of performing HEV travel in 2nd speed stage, for example, it may be performed by setting the first meshing mechanism SM1 to the 3rd-speed side coupled state in which the 3rd-speed drive gear G3a and the first input shaft 4 are coupled, and setting the planetary gear mechanism PG to a locked state in which the rotational elements cannot relatively rotate, and by transmitting the driving force of the electric motor MG to the output member 3 through the intermediary of the 3rd-speed gear train G3. Further, HEV travel in 2nd speed stage is possible by setting the rotational speed of the ring gear Ra to 0 by setting the first meshing mechanism SM1 to the neutral state and the lock mechanism R1 to the fixed state, and by transmitting the driving force of the electric motor MG to the first driven gear Go1 through the path of the 1st speed stage.

To establish the 3rd speed stage by using the driving force of the internal combustion engine ENG, the first meshing mechanism SM1 is set to the 3rd-speed side coupled state in which the 3rd-speed drive gear G3a and the first input shaft 4 are coupled, and the first clutch C1 is engaged to the transmission state. By doing so, the driving force of the internal combustion engine ENG is transmitted to the output member 3 through the intermediary of the engine output shaft 2, the first clutch C1, the first input shaft 4, the first meshing mechanism SM1, and the 3rd-speed gear train G3, and then output at a rotational speed of 1/i.

At the 3rd speed stage, the first meshing mechanism SM1 is in the 3rd-speed side coupled state where the 3rd-speed drive gear G3a and the first input shaft 4 are coupled, so that the sun gear Sa and the carrier Ca of the planetary gear mechanism PG share the same rotation.

Hence, each rotational element of the planetary gear mechanism PG is in the locked state wherein they cannot relatively rotate, so that the decelerative regeneration is implemented by using the electric motor MG to apply brakes to the sun gear Sa, and transmitting the driving force to the sun gear Sa by the electric motor MG allows the HEV travel to be accomplished. Further, it is possible to perform EV travel of traveling only with the driving force of the electric motor MG by releasing the first clutch C1.

In the 3rd speed stage, if the power control device ECU predicts a shift-down on the basis of vehicle information, such as the vehicle speed or the opening degree of the accelerator pedal, then the second meshing mechanism SM2 is set to the 2nd-speed side coupled state in which the 2nd-speed drive gear G2a and the second input shaft 5 are coupled or to the pre-shift state approximating to the aforesaid state. If a shift-up is predicted, then the second meshing mechanism SM2 is set to the 4th-speed side coupled state in which the 4th-speed drive gear G4a and the second input shaft 5 are coupled or the pre-shift state approximating to the aforesaid state.

By doing so, it becomes possible to perform switching of the speed stage by engaging the second clutch C2 to the transmission state and releasing the first clutch C1 to the opened state, so that speed change may be performed smoothly without interrupting the driving force.

To establish a 4th speed stage by using the driving force of the internal combustion engine ENG the second meshing mechanism SM2 is set to the 4th-speed side coupled state in which the 4th-speed drive gear G4a and the second input shaft 5 are coupled, and engaging the second clutch C2 to the transmission state.

During a travel at the 4th speed stage, if the power control device ECU predicts a shift-down on the basis of vehicle information, then the first meshing mechanism SM1 is set to the 3rd-speed side coupled state in which the 3rd-speed drive gear G3a and the first input shaft 4 are coupled or to the pre-shift state approximating to the aforesaid state.

In contrast, if the power control device ECU predicts a shift-up on the basis of vehicle information, then the first meshing mechanism SM1 is set to the 5th-speed side coupled state in which the 5th-speed drive gear G5a and the first input shaft 4 are coupled or to the pre-shift state approximating to the aforesaid state.

By doing so, it becomes possible to accomplish the shift-down or the shift-up simply by engaging the first clutch C1 to the transmission state and releasing the second clutch C2 to the opened state, so that speed change may be performed smoothly without interrupting the driving force.

In the case of performing the decelerative regeneration or the HEV travel during traveling at 4th-speed stage, if the power control device ECU predicts a shift-down, then the first meshing mechanism SM1 is set to the 3rd-speed side coupled state in which the 3rd-speed drive gear G3a and the first input shaft 4 are coupled. The decelerative regeneration may be performed by applying brake by the electric motor MG, and HEV travel may be performed by transmitting the driving force.

If the power control device ECU predicts a shift-up, then the first meshing mechanism SM1 is set to the 5th-speed side coupled state in which the 5th-speed drive gear G5a and the first input shaft 4 are coupled. The decelerative regeneration may be performed by applying brake by the electric motor MG, and HEV travel may be performed by transmitting the driving force from the electric motor MG.

To establish the 5th speed stage by using the driving force of the internal combustion engine ENG the first meshing mechanism SM1 is set to the 5th-speed side coupled state in which the 5th-speed drive gear G5a and the first input shaft 4 are coupled. In the 5th speed stage, the internal combustion engine ENG and the electric motor MG are directly connected when the first clutch C1 is set to the transmission state, so that the HEV travel may be performed by outputting driving force from the electric motor MG, and the decelerative regeneration may be performed by applying brake by the electric motor MG and generate power.

In the case of performing EV travel at the 5th speed stage, the first clutch C1 is set to the opened state. Also, during EV travel at the 5th speed stage, the internal combustion engine ENG may be started by gradually engaging the first clutch C1.

During the travel at the 5th speed stage, if the power control device ECU predicts a shift-down to the 4th speed stage from vehicle information, then the second meshing mechanism SM2 is set to the 4th-speed side coupled state in which the 4th-speed drive gear G4a and the second input shaft 5 are coupled or a pre-shift state approximating to the aforesaid state. By doing so, shift-down to the 4th speed stage may be performed smoothly without interrupting the driving force.

To establish a reverse stage by using the driving force of the internal combustion engine ENG, the third meshing mechanism SM3 is set to the connected state in which the reverse gear GR and the reverse shaft 6 are connected, and then the second clutch C2 is engaged to the transmission state. This changes the rotational speed of the engine output shaft 2 to a negative rotation (rotation in the reverse direction), and the rotational speed is output from the output member 3, thereby establishing the reverse stage.

To carry out the decelerative regeneration or the HEV travel at the reverse stage, the first meshing mechanism SM1 is set to the 3rd-speed side coupled state in which the 3rd-speed drive gear G3a and the first input shaft 4 are coupled, and the planetary gear mechanism PG is set to a locked state wherein the rotational elements cannot relatively rotate. Then, causing the rotor MGb rotating in the reverse direction to generate a driving force on a forward rotation side and applying the brake implements decelerative regeneration, while causing the rotor MGb to generate a driving force on a reverse rotation side implements the HEV travel.

Further, EV travel at the reverse stage may be established by setting both clutches C1 and C2 to the opened state and the lock mechanism R1 to the fixed state, and reversing the electric motor MG.

Further, the vehicle is equipped with an inclination sensor 11 which detects an inclination D of the road to which the vehicle contacts, a vehicle speed sensor 12 which measures a traveling speed of the vehicle (vehicle speed) S, an accelerator pedal sensor 13 which detects the operating amount (stepping amount) of the accelerator pedal, a brake pedal sensor 14 which detects the operating amount (stepping amount) of the brake pedal, a temperature sensor 15 which detects the temperature of the electric motor MG, the electric storage device BATT, and an inverter, not shown, inside the power drive unit PDU, and a navigation system 16 which acquires a terrain information in the surroundings of the travel point of the vehicle. The detected signals from each of the sensors 11 through 15 and the terrain information acquired by the navigation system 16 are input to the power control device ECU.

Further, the power control device ECU is equipped with a zone distinguishing element 21, a required driving force acquiring element 22, an electric motor driving force acquiring element 23, and a speed stage determining element 24. The zone distinguishing element 21 corresponds to a remaining capacity detecting element of the present invention.

Figure 2:
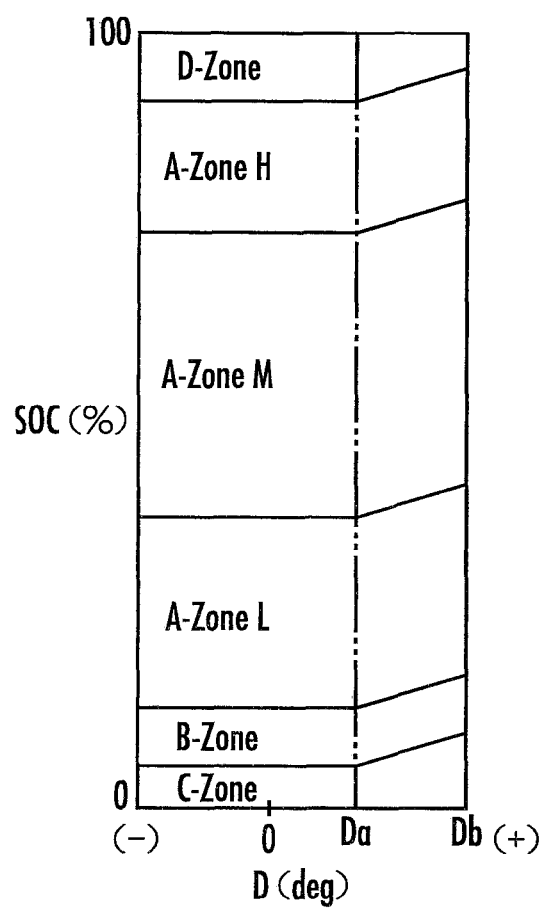
FIG. 2 An explanatory view showing zoning of an electric storage device.

The zone distinguishing element 21 detects a remaining capacity SOC of the electric storage device BATT, and distinguishes a region (zone) on the basis of the detected remaining capacity SOC. As is shown in FIG. 2, the zone distinguishing element 21 performs zone distinguishing by adding the inclination D detected by the inclination sensor to the remaining capacity SOC.

Threshold value of the remaining capacity SOC of each region is set so that the threshold value is constant until the inclination D reaches a predetermined inclination Da larger than 0 degree, and so that the threshold value becomes larger as the inclination D becomes larger when the inclination D is larger than the inclination Da.

However, the inclination Da is not limited to the inclination larger than 0 degree, and may be different for each threshold value of each region. Also, the rate of increase of the threshold value by the inclination D larger than the inclination Da may not be constant, and may be different for each threshold value of each region. The threshold value of each region may be set by adding other elements such as the temperature of the electric storage device BATT. Further, the threshold value of each region may be constant regardless of the inclination D.

Specifically, the zone is classified into an A zone, which is a zone normally used and which becomes a standard zone, a B zone, which has smaller remaining capacity SOC than A zone and which is a discharge limited zone in which the discharge is limited, a C zone which has smaller remaining capacity SOC than B zone and is a discharge prohibited zone in which the discharge is prohibited, and a D zone in which has larger remaining capacity SOC than A zone and is a charge limited zone in which charging is limited. The A zone is further classified into an intermediate zone A zone M in which the remaining capacity SOC is optimum, an A zone L which has smaller remaining capacity SOC than the A zone M, and an A zone H which has larger remaining capacity SOC than the A zone M.

The power control device ECU controls the internal combustion engine ENG, the electric motor MG, and the automatic transmission 1, on the basis of the region (zone) distinguished by the zone distinguishing element 21. As is shown in FIG. 3, the power control device ECU permits, limits, and prohibits various operations, on the basis of the region.

The required driving force acquiring element 22 acquires a required driving force Tq that is necessary to be output from the output shaft 3a, from the vehicle speed S detected by the vehicle speed sensor 12, the operation amount of the accelerator pedal detected by the accelerator pedal sensor 13, and the operation amount of the brake pedal detected by the brake pedal sensor 14. The required driving force acquiring element 22 acquires the required driving force Tq using a map stored in a ROM, not shown, inside the power control device ECU or the like, or a calculation equation and the like.

The electric motor driving force acquiring element 23 acquires a maximum electric motor driving force Tm which becomes the largest among an electric motor driving force Tm capable of being output to the output shaft 3a according to each speed stage by the power output from the electric motor MG, taking into consideration the zone distinguished by the zone distinguishing element 21, according to the vehicle speed S detected by the vehicle speed sensor 12.

In the case where the zone distinguished by the zone distinguishing element 21 is equal to or larger than the A zone M, the electric motor driving force acquiring element 23 first acquires the electric motor driving force Tm capable of being output to the output shaft 3a, according to each speed stages of the 1st speed stage, the 3rd speed stage, and the 5th speed stage by the driving force output from the electric motor MG according to the vehicle speed S detected by the vehicle speed sensor 12.

Figure 4:
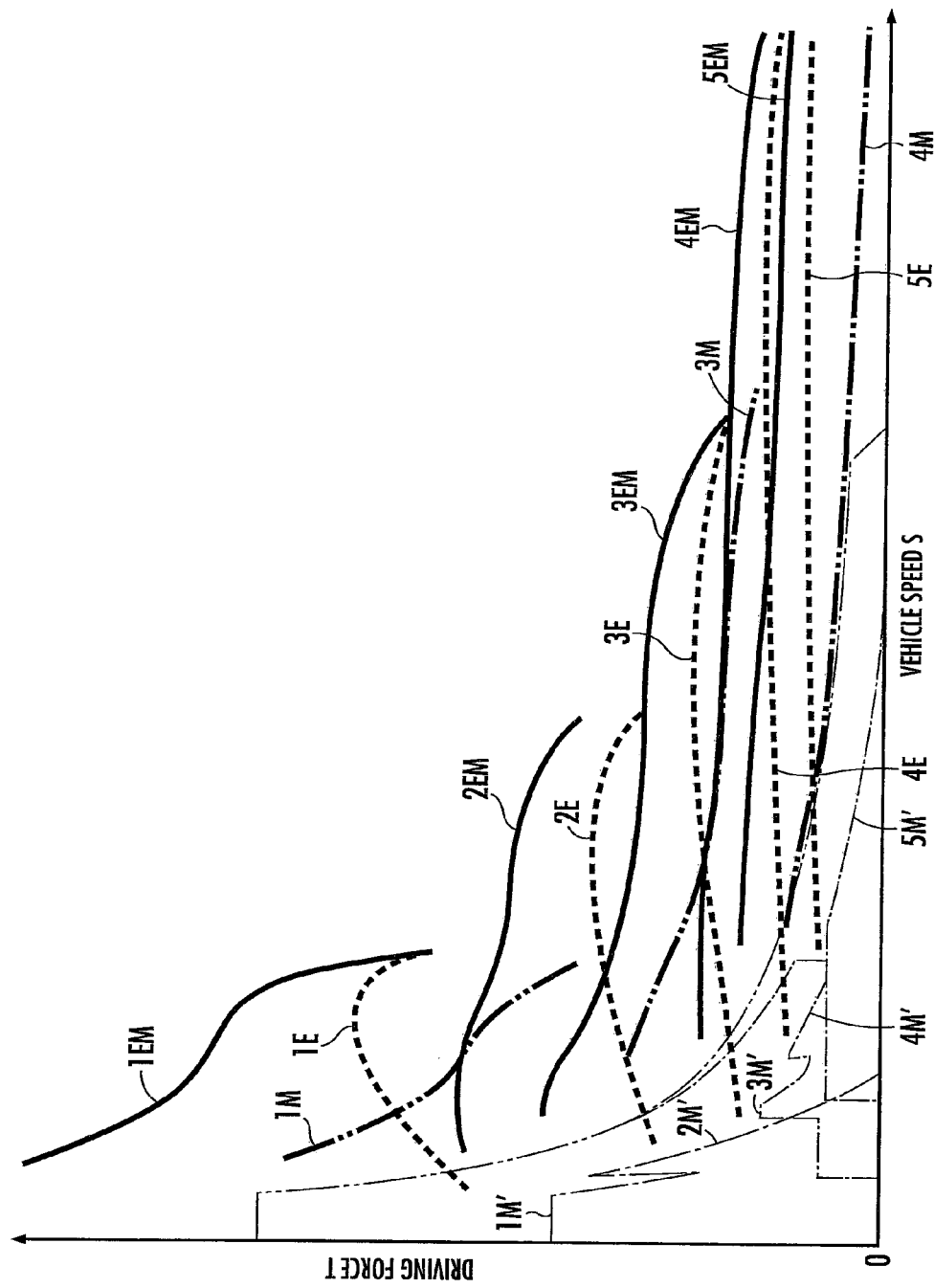
FIG. 4 A view showing an example of a map showing a relationship between a vehicle speed and an upper limit driving force.

Herein, the electric motor driving force acquiring element 23 acquires the electric motor driving force Tm by referring to a map M1 shown in FIG. 4, which is stored in the ROM or the like, not shown, inside the power control device ECU. In the map M1, the upper limit electric motor driving force Tm capable of being output from the electric motor MG according to each speed stage of the 1st speed stage, the 3rd speed stage, and the 5th speed stage, corresponding to the vehicle speed S, is shown by curved lines indicated by 1E, 3E, and 5E, respectively.

Thereafter, in the case where there are plurality of the upper limit electric motor driving forces Tm corresponding to the vehicle speed S, the electric motor driving force acquiring element 23 acquires the largest electric motor driving force Tm as the maximum electric motor driving force Tm, and in the case where there is only one upper limit electric motor driving force Tm corresponding to the vehicle speed S, the electric motor driving force acquiring element 23 acquires this electric motor driving force Tm as the maximum electric motor driving force Tm.

Also, in the case where the zone distinguished by the zone distinguishing element 21 is the A zone L, the electric motor driving force acquiring element 23 acquires the maximum electric motor driving force Tm which becomes the largest among the upper limit electric motor driving forces Tm capable of starting up the internal combustion engine ENG according to each speed stage (the 1st speed stage, the 2nd speed stage, the 3rd speed stage, the 4th speed stage, and the 5th speed stage) from the power output from the electric motor MG according to the vehicle speed S detected by the vehicle speed sensor 12.

This is because in A zone L, as is shown in FIG. 3, the EV travel is being limited, so that it becomes necessary to start the internal combustion engine ENG upon switching from the EV travel to the ENG travel, in the case where the remaining capacity SOC of the electric storage device BATT decreases and transits to the B zone.

Herein, the electric motor driving force acquiring element 23 acquires the electric motor driving force Tm by referring to the map M1. In the map M1, the upper limit electric motor driving force Tm capable of starting up the internal combustion engine ENG according to each speed stages of the 1st speed stage to the 5th speed stage by the electric motor MG according to the vehicle speed S, is shown by two-dot-and-dash curved lines shown by 1M', 2M', 3M', 4M', and 5M', respectively.

Thereafter, in the case where there are plurality of the upper limit electric motor driving forces Tm corresponding to the vehicle speed S, the electric motor driving force acquiring element 23 acquires the largest electric motor driving force Tm as a maximum electric motor driving force Tm, and in the case where there is only one upper limit electric motor driving force Tm corresponding to the vehicle speed S, then the electric motor driving force acquiring element 23 acquires this upper limit electric motor driving force Tm as the maximum electric motor driving force Tm.

Also, in the case where the zone distinguished by the zone distinguishing element 21 is the B zone or the C zone, the electric motor driving force acquiring element 23 acquires 0 as the maximum electric motor driving force Tm. This is because the EV travel is prohibited in the B zone and the C zone, as is shown in FIG. 3.

Figure 5:
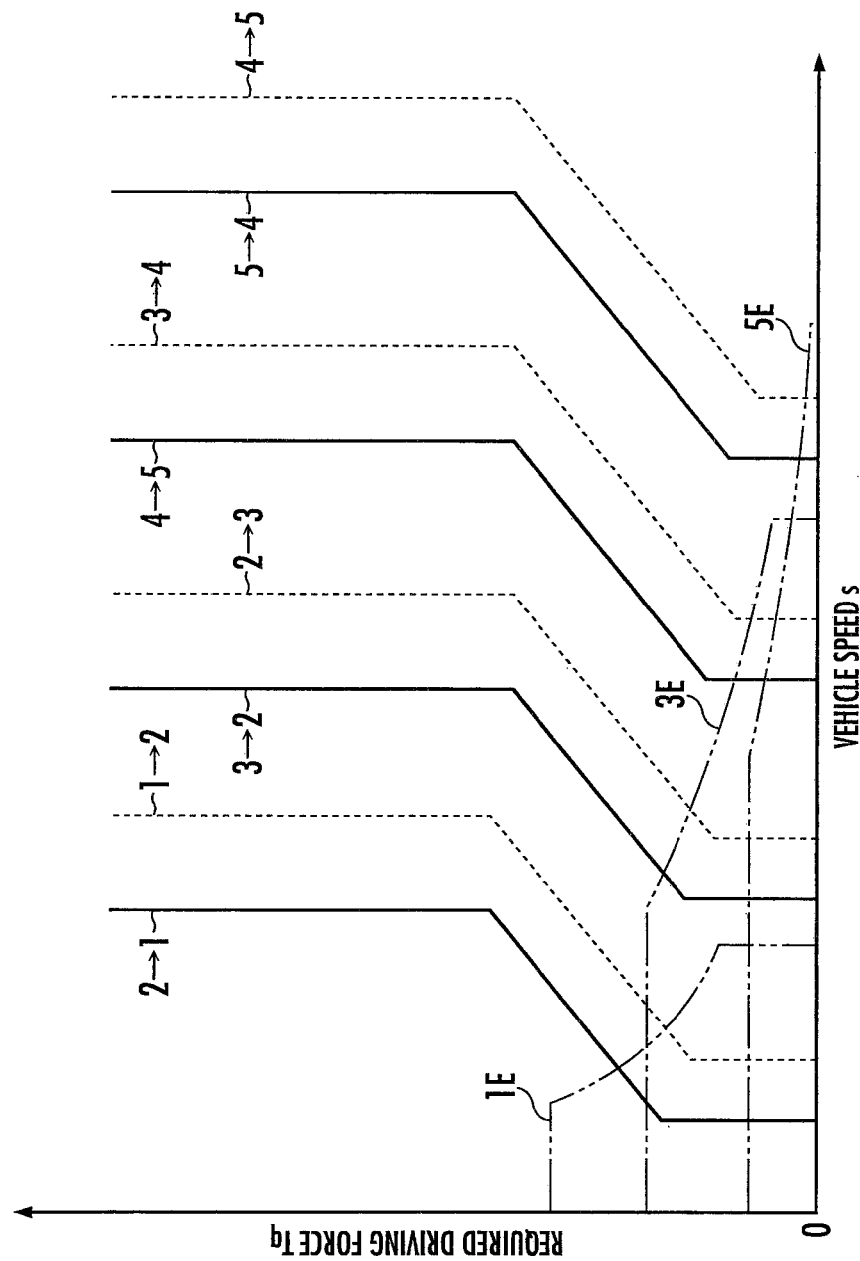
FIG. 5 A view showing an example of a map showing a relationship between the vehicle speed and a required driving force and gear shift.

The speed stage determining element 24 determines the travel state of the vehicle (either of the ENG travel, the EV travel, and the HEV travel), and the speed stage of the automatic transmission 1, referring to a map M2 shown in FIG. 5. In the map M2, a boundary of an EV travel capable region according to each speed stages of the 1st speed stage, the 3rd speed stage, and the 5th speed stage, according to the vehicle speed S and the required driving force Tq, is set by the curved lines indicated by 1E, 3E, and 5E, respectively. The lower left side in FIG. 5 from these curves (the origin 0 side) is the EV travel capable region, and the upper right side in FIG. 5 is an EV travel incapable region.

By doing so, if a point defined by the vehicle speed S detected by the vehicle speed sensor 12 and the required driving force Tq acquired by the required driving force acquiring element 22 according to the change in the vehicle operating state exists in the EV travel capable region, it is basically determined to be the EV travel. However, in the case where the zone distinguished by the zone distinguishing element 21 is the B zone or the C zone, it is determined to be the ENG travel, because EV travel is impossible with reference to FIG. 3. Further, in the case where the zone distinguished by the zone distinguishing element 21 is the A zone L or the B zone, it is determined to be the ENG travel. In the case of the B zone, it may be determined to be the HEV travel according to the situation.

On the other hand, if the point defined by the vehicle speed S and the required driving force Tq is within the EV travel incapable region, then it is determined to be the ENG travel or the HEV travel. Thereafter, in the case where the zone distinguished by the zone distinguishing element 21 is equal to or larger than the A zone M, it is determined to be the HEV travel, because the assisting by the electric motor MG is performed aggressively with reference to FIG. 3. In the case where the zone distinguished by the zone distinguishing element 21 is the A zone L or the B zone, the required driving force Tq is determined as the ENG travel or the HEV travel, because the assisting by the electric motor MG is not performed aggressively with reference to FIG. 3. Determination on the ENG travel or the HEV travel will be explained later. On the other hand, in the case where the zone distinguished by the zone distinguishing element 21 is the C zone, it is determined to the ENG travel, because the EV travel is impossible with reference to FIG. 3.

A variogram is set in the map M2. As the variogram, a total of four shift-up lines, namely, a shift-up line from the 1st speed to the 2nd speed (1→2), a shift-up line from the 2nd speed to the 3rd speed (2→3), a shift-up line from the 3rd speed to the 4th speed (3→4), and a shift-up line from the 4th speed to the 5th speed (4→5), and a total of four shift-down lines, namely, a shift-down line from the 2nd speed to the 1st speed (2→1), a shift-down line from the 3rd speed to the 2nd speed (3→2), a shift-down line from the 4th speed to the 3rd speed (4→3), and a shift-down line from the 5th speed to the 4th speed (5→4).

By doing so, for example, when the point defined by the vehicle speed S detected by the vehicle speed sensor 12 and the required driving force Tq obtained by the required driving force acquiring element 22 crosses the shift-up line from the 2nd speed to the 3rd speed (2→3) from the right side to the left side in FIG. 5 by the change in the vehicle operating state, basically the speed stage determining element 24 shifts up the speed stage from the 2nd speed stage to the 3rd speed stage. Also, when the point defined by the vehicle speed S and the required driving force Tq crosses the shift-down line from the 3rd speed to the 2nd speed (3→2) from the left side to the right side of FIG. 5 by the change in the vehicle operating state, basically the speed stage determining element 24 shifts down the speed stage from the 3rd speed stage to the 2nd speed stage.

On the other hand, when the point crosses the shift-up line from the 2nd speed to the 3rd speed (2→3) from the right side to the left side in FIG. 5, basically the speed stage determining element 24 shifts up the speed stage from the 2nd speed stage to the 3rd speed stage. Also, when the point defined by the vehicle speed S and the required driving force Tq crosses the shift-down line from the 3rd speed to the 2nd speed (3→2) from the left side to the right side in FIG. 5 by the change in the vehicle operating state, basically the speed stage determining element 24 shifts down the speed stage from the 3rd speed stage to the 2nd speed stage.

The variogram set in the map M2 is corrected according to the zone distinguished by the zone distinguishing element 21, the temperature detected by the temperature sensor 15, and the terrain information acquired by the navigation system 16, and the like. For example, in the case where the zone distinguished by the zone distinguishing element 21 is equal to or larger than the A zone M, each shift-down line is corrected so as to offset upward, so as to perform assisting by the electric motor MG aggressively with reference to FIG. 3. However, when the temperature detected by the temperature sensor 15 is a temperature equal to or higher than a predetermined threshold value, each shift-down line is not corrected to offset upward, even in the case where the zone distinguished by the zone distinguishing element 21 is equal to or larger than the A zone M, so as not to aggressively operate the electric motor MG.

Also, in the case where it is determined from the terrain information acquired by the navigation system 16 that the vehicle is traveling a highland, the upper limit of the driving force capable of being generated by the internal combustion engine ENG increases. Therefore, each shift-down line is corrected so as to offset downward, according to the altitude. Also, in the case where it is determined from the terrain information acquired by the navigation system 16 that the vehicle is approaching a climbing road, it is predicted that the required driving force Tq will increase. Therefore, each shift-down line is corrected so as to offset downward, according to the inclination of the climbing road.

In the map M1, an upper limit driving force T capable of being output to the output shaft 3a according to each speed stage of the 1st speed stage to the 5th speed stage of the HEV travel, according to the vehicle speed S, is shown by curved lines indicted by 1EM, 2EM, 3EM, 4EM, and 5EM, respectively. Further, in the map M1, an upper limit driving force T capable of being output to the output shaft 3a according to each speed stage of the 1st speed stage to the 5th speed stage of the ENG travel, according to the vehicle speed S, is shown by curved lines indicated by 1E, 2E, 3E, 4E, and 5E, respectively.

In the map M2, the variogram is set so that the driving force T corresponding to the vehicle speed S in the map M1 becomes the speed stage exceeding the required driving force Tq. In the case where there are a plurality of the speed stages in which the driving force T exceeds the required driving force Tq corresponding to the vehicle speed S, generally the larger speed stage is selected. However, in the case where the required driving force Tq corresponding to the vehicle speed S exceeds all of the driving forces T of each speed stage of the ENG travel, then the speed stage by the HEV travel is determined referring to a map M.

In the case where the zone distinguished by the zone distinguishing element 21 is the A zone L or the B zone, the speed stage determining element 24 basically determines to be ENG travel. However, in the case where the required driving force Tq exceeds the upper limit driving force T during ENG travel, then it is determined to HEV travel in which assisting is performed by the electric motor MG for the excess amount.

Figure 6:
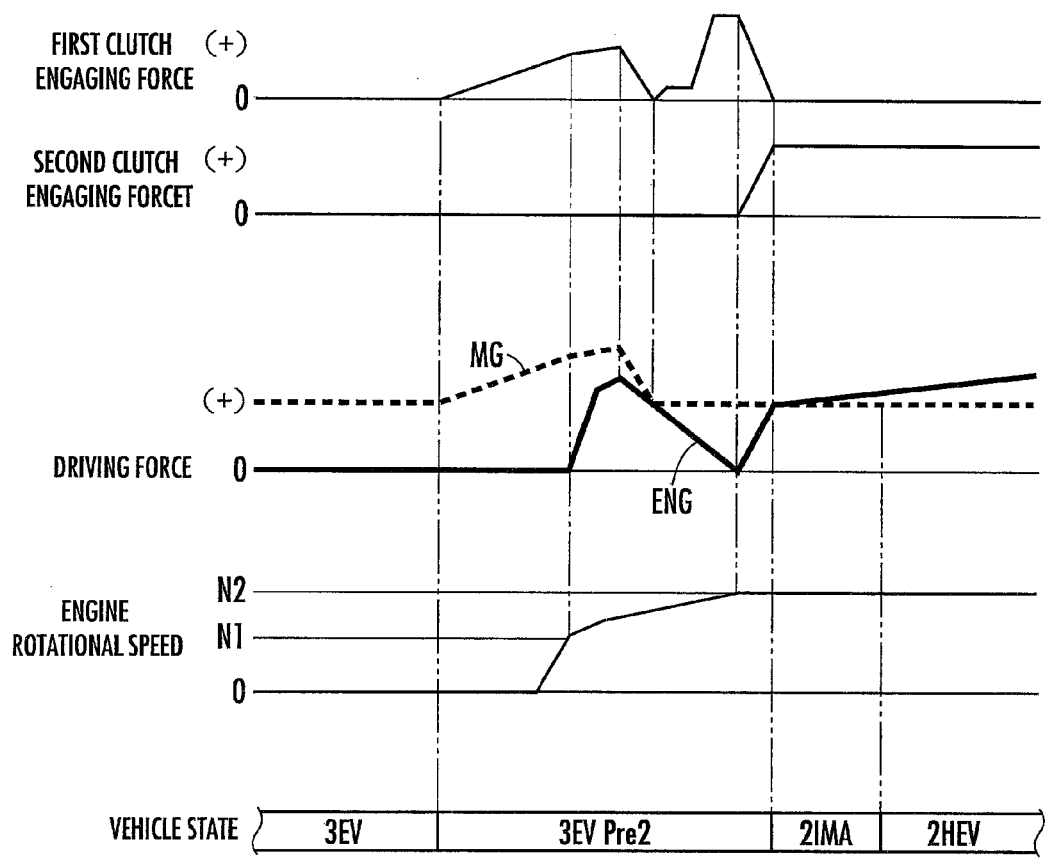
FIG. 6 A time chart explaining transition from 3rd-speed EV travel to 2nd-speed HEV travel.

The power control device ECU receives the decision of the speed stage determining element 24, and controls each unit as is shown in FIG. 6. In the case where the vehicle is performing the EV travel at 3rd speed stage, when the speed stage determining element 24 performs the determination, the first clutch C1 is gradually engaged after setting the second meshing mechanism SM2 to the 2nd-speed side coupled state to set the automatic transmission 1 to the 2nd-speed pre-shift state. At this time, the driving force transmitted to the output shaft 3a decreases from the friction of the first clutch C1, so that the driving force of the electric motor MG is increased so as to compensate the decrease.

At this time, because the speed stage of the automatic transmission 1 is not changed, it becomes possible to restrict the deceleration accompanying the speed change at the start up of the internal combustion engine ENG, and to maintain the vehicle speed. Further, the automatic transmission 1 is in the 2nd-speed pre-shift state which can be easily transferred to the 2nd-speed stage, so that it becomes possible to promptly transmit to the 2nd speed stage, after starting up of the internal combustion engine ENG.

Thereafter, when the rotational speed Ne of the engine output shaft 2 reaches a start up rotational speed N1 which is a rotational speed capable of starting up the internal combustion engine ENG, an ignition plug (not shown) is ignited and the international combustion engine ENG is made to perform firing. After confirming the firing, the first clutch C1 is set to the opened state.

Thereafter, the second clutch C2 is gradually engaged, after setting the first meshing mechanism SM1 to the neutral state and to the 2nd speed state. After the rotational speed of the engine output shaft 2 reaches a target rotational speed N2 and the start up of the internal combustion engine ENG is completed, the second clutch C2 is engaged to the transmission state. Thereafter, the vehicle is made to travel while the electric motor MG is made to regenerate power according to the difference between the driving force of the internal combustion engine ENG and the required driving force Tq. At this time, it becomes possible to promptly accelerate the vehicle, because the speed stage is transited to the 2nd speed stage which has lower transmission gear ratio than the speed stage during EV travel.

Figure 7:
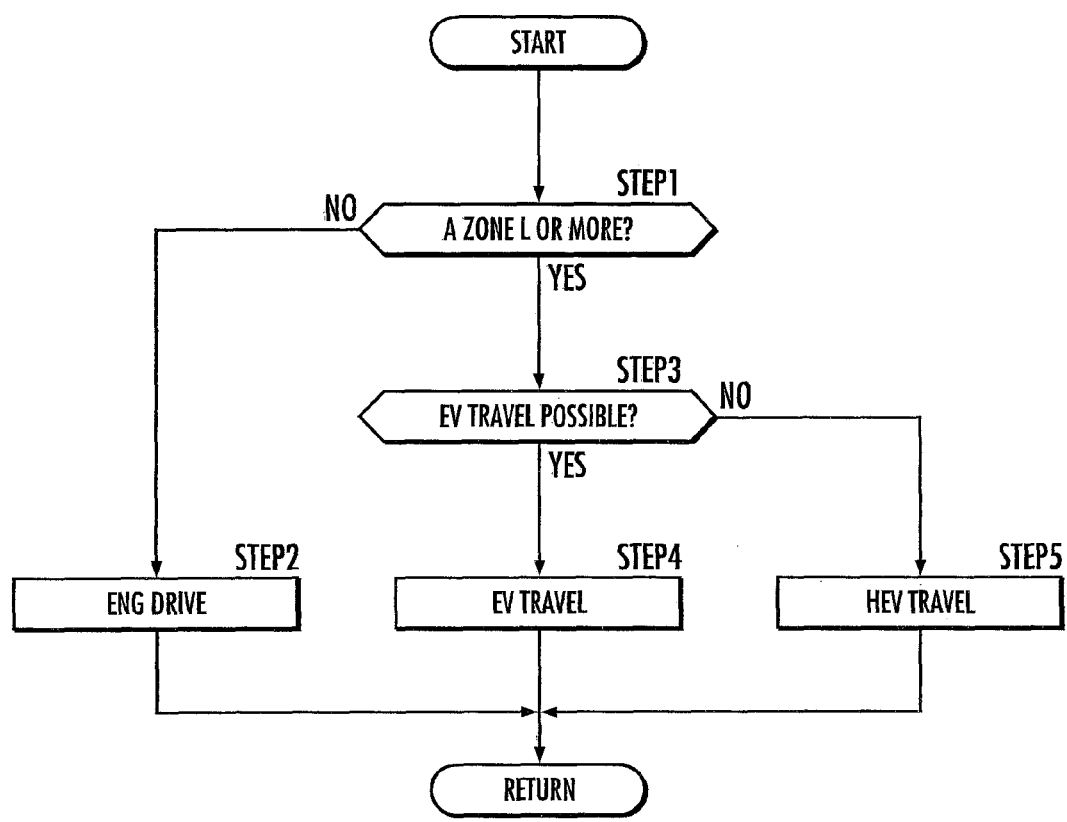
FIG. 7 A flow chart showing traveling control of the hybrid vehicle.

Next, the control of the hybrid vehicle will be explained with reference to FIG. 7. The following process is executed by the power control device ECU corresponding to the control element of the present invention.

First, it is determined whether or not the zone distinguished by the zone distinguishing element 21 is equal to or larger than the A zone L (STEP 1). In the case where the distinguished zone is smaller than the A zone L, that is, the B zone or the C zone (STEP 1: NO), then the ENG travel is performed at the speed stage determined by the speed stage determining element 24 (STEP 2).

On the other hand, in the case where the distinguished zone is equal to or larger than the A zone L (STEP 1: YES), then it is determined whether or not the EV travel is possible (STEP 3). Whether or not the EV travel is possible is determined according to whether or not the point defined by the vehicle speed S detected by the vehicle speed sensor 12 and the required driving force Tq acquired by the required driving force acquiring element 22 on the map M2 is within the EV travel possible region.

In the case where the required driving force Tq is equal to or smaller than the maximum electric motor driving force Tm (STEP 3: YES), then the EV travel is performed at the speed stage determined by the speed stage determining element 24 (STEP 4).

On the other hand, in the case where the required driving force Tq exceeds the maximum electric motor driving force Tm (STEP 3: NO), the HEV travel is performed at the speed stage determined by the speed stage determining element 24 (STEP 5).

As is explained above, in the case where the distinguished zone is equal to or larger than the A zone L (STEP 1: YES), if the required driving force Tq is equal to or smaller than the maximum electric motor driving force Tm (STEP 3: YES), the EV travel is performed (STEP 4). Therefore, it becomes possible to reduce the fuel consumption amount by the internal combustion engine ENG.

At this time, the automatic transmission 1 is set to the highest speed stage state in which the required driving force Tq may be output by the electric motor MG. Therefore, it becomes possible to reduce the rotational speed of the first input shaft 4, and thereafter, it becomes possible to restrict the vibration generated at an engine mount, when the first clutch C1 is set to the transmission state and the internal combustion engine ENG is started up.

Also, in the case where the distinguished zone is equal to or larger than the A zone L (STEP 1: YES), when the required driving force Tq becomes equal to or smaller than the maximum electric motor driving force Tm during HEV travel (STEP 3: YES), then EV travel is performed (STEP 4). Therefore, it becomes possible to reduce the fuel consumption amount by the internal combustion engine ENG.

Also, when shifting down while referring to the map M2 during ENG travel or the HEV travel at 3rd speed stage or the 5th speed stage, in the case where the zone distinguished by the zone distinguishing element 21 is the A zone M or the A zone H, the electric motor MG is made to perform regeneration operation, by maintaining the current speed stage, or by operating, after establishing the speed stage lower by one speed stage, the first clutch C1 to the state of establishing the speed stage further lower by one speed stage, according to the predicted value of the required driving force Tq.

Specifically, for example, when shifting down while referring to the map M2 during ENG travel at 3rd speed stage, in the case where the zone distinguished by the zone distinguishing element 21 is the A zone M or the A zone H, in the case where the decrease of the required driving force Tq is predicted, the vehicle is made to perform ENG travel while maintaining the current 3rd speed stage. On the other hand, in the case where the increase of the required driving force Tq is predicted, the electric motor MG is made to perform regenerative operation by first performing ENG travel at 2nd speed stage by setting the first clutch C1 to the opened state, as well as setting the second meshing mechanism SM2 to the 2nd-speed side coupled state and setting the second clutch C2 to the opened state, and thereafter immediately setting the first meshing mechanism SM1 to the neutral state and to the pre-down shift.

By doing so, it becomes possible to select the appropriate speed stage, in the case where the increase or decrease of the required driving force Tq is predictable. The increase or decrease of the required driving force Tq is predicted, for example, according to the terrain information acquired by the navigation system 16 and the like.

Also, even when shifting down while referring to the map M2 during ENG travel or the HEV travel at 3rd speed stage or the 5th speed stage, the current speed stage is maintained in the case where the zone distinguished by the zone distinguishing element 21 is the A zone L or the B zone.

In the case of the A zone L or the B zone, generally the HEV travel is not performed, with reference to FIG. 3. However, in order to prevent shifting different from the intention of the driver from being performed frequently, there are cases where the speed stage is maintained and the ENG travel is switched to the HEV travel, even when the remaining capacity SOC drops to the A zone L or the B zone, until the accelerator pedal sensor 13 detects the stepping of the accelerator pedal.

In this case, the remaining capacity SOC of the electric storage device BATT is increased, by performing regenerative operation of the electric motor MG while maintaining a net fuel consumption rate BSFC of the internal combustion engine ENG.

Also, in the case where the vehicle is made to travel by establishing the speed stage of the transmission (for example, the 5th speed stage) with the coupled state by the first meshing mechanism SM1, the required driving force Tq is small, and it is possible to make the vehicle travel at a lower speed stage (for example, the 3rd speed stage or the 4th speed stage) than the current speed stage (for example, the 5th speed stage) with reference to the map M1, so that if a fuel consumption rate deteriorates from a predetermined threshold value set previously if the vehicle continues traveling at the current speed stage (for example, the 5th speed stage), either one of a first means or a second means explained below is performed selectively. By doing so, it becomes possible to prevent the fuel consumption rate from deteriorating by continuing traveling at the current speed stage. Further, the electricity generated by the regenerative operation of the electric motor MG by providing the difference between the required driving force Tq and the internal combustion engine ENG thereto may be supplied to the electric storage device BATT, and the generated electricity may be stored in the electric storage device BATT.

The first means makes the vehicle travel by first setting the first clutch C1 to the interrupted state, setting the second clutch C2 to the transmission state and establishing the speed stage (for example, the 4th speed stage) by the coupled state by the second meshing mechanism SM2, and also couples the first input shaft 4 to the gear train (the 3rd-speed gear train or the 5th-speed gear train) by the first meshing mechanism SM1. The gear train to be coupled by the first meshing mechanism SM1 is selected so as to maximize the efficiency of securing the regeneration amount. The second means changes the gear train connected by a 1st selecting element (for example, the 5th-speed gear train G5) to the gear train with lower transmission gear ratio (for example, the 3rd-speed gear train). However, before setting the second clutch C2 to the transmission state, the coupled state by the second meshing mechanism SM2 is completed. By doing so, it becomes possible to avoid providing transmission shock to the driver.

It is preferable to select whether to perform the first means or to perform the second means, giving priority to the electricity storage at the electric storage device BATT in the case of the B zone, the C zone or the A zone L, and giving priority to the fuel consumption rate in the case of the D zone, the A zone H or the A zone M. In the case of selecting while giving priority to the electricity storage at the electric storage device BATT, the speed stage is determined, for example, by referring to a map showing a powering/regenerating efficiency with a relationship between the vehicle speed and the torque. In the case of selecting while giving priority to the fuel consumption rate, the speed stage is determined, for example, by referring to a map showing the net fuel consumption rate (BSFC) with a relationship between the vehicle speed and the torque.

Figure 8:
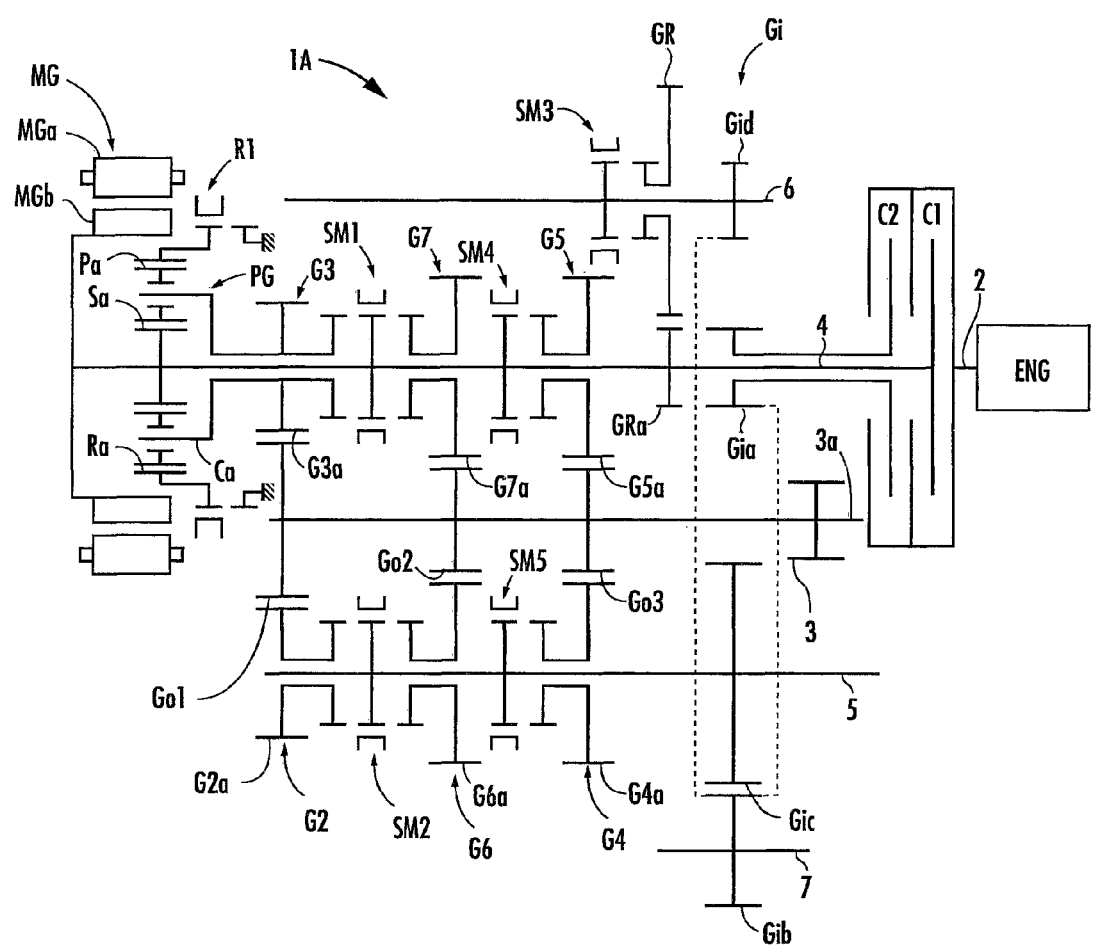
FIG. 8 An explanatory view showing another automatic transmission that the hybrid vehicle according to the embodiment of the present invention equips.

Further, the automatic transmission provided to the hybrid vehicle of the present invention is not limited to the automatic transmission 1 having five forward speed stages and one rearward speed stage explained above, and may be, for example, an automatic transmission 1A having seven forward speed stages and one rearward speed stage, as is shown in FIG. 8.

The automatic transmission 1A is equipped with a plurality of gear trains G2 to G7 of different transmission gear ratios, the drive gears G3a, G5a, and G7a of the odd gear trains G3, G5 and G7 are rotatably supported by the first input shaft 4, and the drive gears G2a, G4a, and G6a of the even gear trains G2, G4, and G6 are rotatably supported by the second input shaft 5.

To the output shaft 3a, the first driven gear Go1 meshing with the 2nd-speed drive gear G2a and the 3rd-speed drive gear G3a, the second driven gear Go2 meshing with a 6th-speed drive gear G6a and a 7th-speed drive gear G7a, and a third driven gear Go3 meshing with the 4th-speed drive gear G4a and the 5th-speed drive gear G5a, are fixed.

The first input shaft 4 is provided with the first meshing mechanism SM1, which is the first selecting element capable of switching to either of the 3rd-speed side coupled state in which the 3rd-speed drive gear G3a and the first input shaft 4 are coupled, a 7th-speed side coupled state in which the 7th-speed drive gear G7a and the first input shaft 4 are coupled, and the neutral state in which the coupling of the 3rd-speed drive gear G3a and the 7th-speed drive gear G7a to the first input shaft 4 is cut off.

The first input shaft 4 is further provided with a fourth meshing mechanism SM4 which is the first selecting element capable of switching to either of the 5th-speed side coupled state in which the 5th-speed drive gear G5a and the first input shaft 4 are coupled, and the neutral state in which the coupling of the 5th-speed drive gear G5a to the first input shaft 4 is cut off.

The second input shaft 5 is provided with the second meshing mechanism SM2, which is the second selecting element capable of switching to either of the 2nd-speed side coupled state in which the 2nd-speed drive gear G2a and the second input shaft 5 are coupled, a 6th-speed side coupled state in which the 6th-speed drive gear G6a and the second input shaft 5 are coupled, and the neutral state in which the coupling of the 2nd-speed drive gear G2a and the 6th-speed drive gear G6a to the second input shaft 5 are cut off.

The second input shaft 5 is further provided with a fifth meshing mechanism SM5 which is the second selecting element capable of switching to the 4th-speed side coupled state in which the 4th-speed drive gear G4a and the second input shaft 5 are coupled, and the neutral state in which the coupling of the 4th-speed drive gear G4a to the second input shaft 5 are cut off.

The hybrid vehicle equipped with the automatic transmission 1A configured as explained above is capable of performing the IMA starting, and the ENG travel, the HEV travel and the EV travel in the state where the seven forward speed stages and the rear speed stage are respetively established, and the idling stop control and the control during the EV travel is executed by the power control device ECU.

Further, the automatic transmission provided to the hybrid vehicle of the present invention is not limited to the automatic transmission in which the output mechanism is constituted from one output shaft 3a, and may be, for example, the one in which the output mechanism is constituted from two output shafts, one output shaft being coupled to the first input shaft via the gear train selected by the first selecting element, and the other output shaft being coupled to the second input shaft via the gear train selected by the second selecting element.

The invention claimed is:

1. A hybrid vehicle, comprising: an internal combustion engine; an electric motor; an electric storage device providing and receiving electric power to and from the electric motor; an automatic transmission including a first converting mechanism connected to the electric motor, the first converting mechanism is transmitted with a driving force of the internal combustion engine selectively via a first make-and-break element, and a second converting mechanism which is transmitted with the driving force of the internal combustion engine selectively via a second make-and-break element, wherein a motive power output from the internal combustion engine and the electric motor is changed to a plurality of speed stages and is output;

a remaining capacity detecting element which detects a remaining capacity of the electric storage device;

a required driving force acquiring element which acquires a required driving force that is necessary to be output;

an electric motor driving force acquiring element which acquires a maximum electric motor driving force capable of being output according to each speed stage by the motive power output from the electric motor, at least taking into consideration the remaining capacity of the electric storage device detected by the remaining capacity detecting element;

a control element which determines a highest speed stage in which the electric motor is capable of outputting the required driving force, when the required driving force acquired by the required driving force acquiring element is equal to or smaller than the maximum electric motor driving force acquired by the electric motor driving force acquiring element, controls the automatic transmission so that the determined speed stage is set, and controls so as to make the vehicle travel only from the driving force of the electric motor, by setting the first make-and-break element and the second make-and-break element to an interrupted state;

a variable speed map which selects a speed stage of the automatic transmission on the basis of the required driving force acquired by the required driving force acquiring element, and a zone distinguishing element which distinguishes, on the basis of the detected remaining capacity detected by the remaining capacity detecting element, a standard zone, a discharge limited zone in which the remaining capacity is smaller than the standard zone, a discharge prohibited zone in which the remaining capacity is smaller than the discharge limited zone, and a charge prohibited zone in which the remaining capacity is larger than the standard zone, wherein the first converting mechanism includes a first input shaft which is transmitted with the driving force of the internal combustion engine selectively via the first make-and-break element, and which is connected to the electric motor, and a first selecting element which couples the first input shaft and an output mechanism via a gear train selected from a plurality of gear trains, the second converting mechanism includes a second input shaft which is transmitted with the driving force of the internal combustion engine selectively via the second make-and-break element, and a second selecting element which couples the second input shaft and the output mechanism via a gear train selected from a plurality of the gear trains, and when the vehicle is made to travel by the driving force of the internal combustion engine by establishing the speed stage of the automatic transmission with the coupled state by the first selecting element, in the case of changing to a lower speed stage side of the automatic transmission by referring to the variable speed map, the control element establishes a speed stage lower by one speed stage from the speed stage by setting the first make-and-break element to the transmission interrupted state and the second selecting element to the connected state and the second make-and-break element to the transmission state, according to an estimated value of the required driving force in the case where the zone distinguished by the zone distinguishing element is the standard zone, and thereafter make the electric motor to regenerate power by either maintaining the current speed stage or setting the first selecting element to the state where a speed stage further lower by one speed stage is established.

2. The hybrid vehicle according to claim 1, wherein the first converting mechanism includes a first input shaft connected to the electric motor, the first input shaft is transmitted with the driving force of the internal combustion engine selectively via the first make-and-break element, and a first selecting element which couples the first input shaft and an output mechanism via a gear train selected from a plurality of gear trains, the second converting mechanism includes a second input shaft which is transmitted with the driving force of the internal combustion engine selectively via the second make-and-break element, and a second selecting element which couples the second input shaft and the output mechanism via a gear train selected from a plurality of the gear trains, and in the case where the vehicle is made to travel only from the driving force of the electric motor by establishing the speed stage of the automatic transmission with a coupled state by the first selecting element, when the required driving force acquired by the required driving force acquiring element exceeds the maximum electric motor driving force acquired by the electric motor driving force acquiring element, the control element couples the gear train to the output mechanism by the second selecting element without setting the second make-and-break element to a transmission state, while maintaining the coupled state by the first selecting element, starts up the internal combustion engine by gradually setting the first make-and-break element to the transmission state, thereafter makes the internal combustion engine fire, and makes the vehicle travel by the driving force of the internal combustion engine and the electric motor, by setting the second make-and-break element to the transmission state after completion of the start up of the internal combustion engine.

3. The hybrid vehicle according to claim 2, wherein, in the case where the vehicle is made to travel by the driving force of the internal combustion engine and the electric motor, when the required driving force acquired by the required driving force acquiring element becomes equal to or less than the maximum electric motor driving force acquired by the electric motor driving force acquiring element, the control element sets the first make-and-break element and the second make-and-break element to the interrupted state, and makes the vehicle travel only from the driving force of the electric motor.

4. The hybrid vehicle according to claim 1, wherein, in the case where the vehicle is made to travel by the driving force of the internal combustion engine and the electric motor, when the required driving force acquired by the required driving force acquiring element becomes equal to or less than the maximum electric motor driving force acquired by the electric motor driving force acquiring element, the control element sets the first make-and-break element and the second make-and-break element to the interrupted state, and makes the vehicle travel only from the driving force of the electric motor.

5. A hybrid vehicle, comprising: an internal combustion engine; an electric motor; an electric storage device providing and receiving electric power to and from the electric motor; an automatic transmission including a first converting mechanism connected to the electric motor, the first converting mechanism is transmitted with a driving force of the internal combustion engine selectively via a first make-and-break element, and a second converting mechanism which is transmitted with the driving force of the internal combustion engine selectively via a second make-and-break element, wherein a motive power output from the internal combustion engine and the electric motor is changed to a plurality of speed stages and is output;
- a remaining capacity detecting element which detects a remaining capacity of the electric storage device;
- a required driving force acquiring element which acquires a required driving force that is necessary to be output;
- an electric motor driving force acquiring element which acquires a maximum electric motor driving force capable of being output according to each speed stage by the motive power output from the electric motor, at least taking into consideration the remaining capacity of the electric storage device detected by the remaining capacity detecting element;
- a control element which determines a highest speed stage in which the electric motor is capable of outputting the required driving force, when the required driving force acquired by the required driving force acquiring element is equal to or smaller than the maximum electric motor driving force acquired by the electric motor driving force acquiring element, controls the automatic transmission so that the determined speed stage is set, and controls so as to make the vehicle travel only from the driving force of the electric motor, by setting the first make-and-break element and the second make-and-break element to an interrupted state;
- a variable speed map which selects a speed stage of the automatic transmission on the basis of the required driving force acquired by the required driving force acquiring element, and
- a zone distinguishing element which distinguishes, on the basis of the remaining capacity detected by the remaining capacity detecting element, a standard zone, a discharge limited zone in which the remaining capacity is smaller than the standard zone, and a discharge prohibited zone in which the remaining capacity is smaller than the discharge limited zone,
- wherein the first converting mechanism includes a first input shaft which is transmitted with the driving force of the internal combustion engine selectively via the first make-and-break element, and which is connected to the electric motor, and a first selecting element which couples the first input shaft and an output mechanism via a gear train selected from a plurality of gear trains,
- the second converting mechanism includes a second input shaft which is transmitted with the driving force of the internal combustion engine selectively via the second make-and-break element, and a second selecting element which couples the second input shaft and the output mechanism via a gear train selected from a plurality of the gear trains, and
- when the vehicle is made to travel by the driving force of the internal combustion engine by establishing the speed stage of the automatic transmission with the coupled state by the first selecting element, in the case of changing to a lower speed stage side of the automatic transmission by referring to the variable speed map, the control element maintains the speed stage in the case where the zone distinguished by the zone distinguishing element is the discharge limited zone or the discharge prohibited zone.

6. The hybrid vehicle according to claim 5, wherein in the case where the vehicle is made to travel by establishing the speed stage of the automatic transmission with the coupled state by the first selecting element, when the required driving force acquired by the required driving force acquiring element is small and it is possible to make the vehicle travel at a lower speed stage than the current speed stage by referring to the variable speed map, and a fuel consumption rate deteriorates than a predetermined threshold value if the travel is pursued at the current speed stage,
- the control element supplies electricity to the electric storage device by regenerating a difference between the required driving force and the driving force of the internal combustion engine by the electric motor by either one of
- a first means in which the vehicle is made to travel by establishing the speed stage of the automatic transmission with the coupled state by the second selecting element by setting the second make-and-break element to the transmission state, after setting the first make-and-break element to the interrupted state, and the first input shaft is coupled to the gear train with the first selecting element, or
- a second means in which the gear train coupled by the first selecting element is changed to a gear train with lower transmission gear ratio.

7. The hybrid vehicle according to claim 6, wherein, in the case of performing the first means, the control element makes the first selecting element couple the first input shaft and the output mechanism by a gear train in which efficiency of securing regeneration amount is maximum.

* * * * *